(12) United States Patent
Ash (10) Patent No.: US 8,182,190 B2
(45) Date of Patent: May 22, 2012

(54) UNLOADING SYSTEM AND METHOD FOR CONTINUOUSLY MOVING RAPID DISCHARGE RAILCARS

(75) Inventor: Lloyd Ash, Pleasant Grove, UT (US)

(73) Assignee: Ashross, LLC, Pleasant Grove, UT (US)

( * ) Notice: Subject to any disclaimer, the term of this patent is extended or adjusted under 35 U.S.C. 154(b) by 478 days.

(21) Appl. No.: 12/411,581

(22) Filed: Mar. 26, 2009

(65) Prior Publication Data

US 2009/0245987 A1    Oct. 1, 2009

(51) Int. Cl.
*B65G 67/00* (2006.01)
(52) U.S. Cl. .................... 414/376; 414/373; 414/572
(58) Field of Classification Search .................. 414/334, 414/809, 376, 378, 373, 572, 303, 333, 336, 414/352, 393, 502, 574, 353, 268, 328; 104/29, 104/50; 105/241.2, 247, 248, 282.1, 364, 105/161, 262; 198/530, 540, 733; 193/25 R; 238/10 R, 11, 12
See application file for complete search history.

(56) References Cited

U.S. PATENT DOCUMENTS

| | | | |
|---|---|---|---|
| 657,371 A | 9/1900 | Webre | |
| 1,143,641 A * | 6/1915 | McGregor | 105/247 |
| 1,567,837 A * | 12/1925 | Comer | 414/574 |
| 2,127,120 A * | 8/1938 | Johnson et al. | 366/18 |
| 2,826,315 A | 3/1958 | Hatsujiro | |
| 3,349,892 A | 10/1967 | Barre | |
| 3,420,480 A | 1/1969 | Matson | |
| 3,802,584 A | 4/1974 | Sackeet, Sr. et al. | |
| 3,830,357 A | 8/1974 | West et al. | |
| 3,841,236 A * | 10/1974 | Hammonds et al. | 105/364 |
| 3,891,099 A * | 6/1975 | Smith | 414/268 |
| 4,000,822 A | 1/1977 | Raabe | |
| 4,004,311 A * | 1/1977 | Nola | 14/71.7 |
| 4,037,735 A | 7/1977 | Alhoff | |
| 4,120,408 A | 10/1978 | Gehring et al. | |
| 4,230,220 A | 10/1980 | Ilno | |

(Continued)

FOREIGN PATENT DOCUMENTS

JP    52- 145976    12/1977

(Continued)

OTHER PUBLICATIONS

MPM Mineral Porcessing of Marketing, Inc., Mineral Unloading System, Sideswiper, Hoper Car Unloader, Rapid Mineral Unloading . . . www.minpromark.com/wiki/MPM/SideSwiper, May 11, 2006, 2 pages.

(Continued)

*Primary Examiner* — Saul Rodriguez
*Assistant Examiner* — Glenn Myers
(74) *Attorney, Agent, or Firm* — Thorpe North & Western LLP (57) ABSTRACT

An unloading station and method for unloading bulk material from a moving railcar with a bottom discharge while the railcar is moving includes a track with a pair of rails. A synchronized parallel conveyor is oriented parallel with the pair of rails and forms a movable platform capable of receiving the bulk material in a pile extending into the railcar and drawing the pile along in synchronization with the railcar as the railcar moves. A hopper is disposed below a break in or end of the parallel conveyor to receive the bulk material. A lateral conveyor disposed under the hopper to convey the bulk material away from the hopper.

19 Claims, 9 Drawing Sheets

U.S. PATENT DOCUMENTS

| | | | |
|---|---|---|---|
| 4,244,463 A | 1/1981 | Bartley | |
| 4,261,678 A | 4/1981 | Kruger | |
| 4,358,238 A | 11/1982 | Ely | |
| 4,363,396 A | 12/1982 | Wolf et al. | |
| 4,379,669 A | 4/1983 | Wilson | |
| 4,549,648 A | 10/1985 | Langer | |
| 4,629,060 A | 12/1986 | Schlegel et al. | |
| 4,655,401 A * | 4/1987 | Binzen et al. | 241/69 |
| 4,669,674 A * | 6/1987 | Oldengott et al. | 241/101.71 |
| 4,776,449 A | 10/1988 | Hoffmann et al. | |
| 4,813,839 A | 3/1989 | Compton | |
| 4,881,691 A | 11/1989 | Oldengott et al. | |
| 5,024,568 A | 6/1991 | Johnston | |
| 5,119,738 A * | 6/1992 | Snead | 105/250 |
| 5,297,914 A | 3/1994 | Ash | |
| 5,297,920 A | 3/1994 | Pomerville et al. | |
| 5,302,071 A * | 4/1994 | Binzen | 414/376 |
| 5,310,121 A | 5/1994 | Nilson et al. | |
| 5,387,058 A | 2/1995 | Smoot | |
| 6,203,261 B1 | 3/2001 | South et al. | |
| 6,257,150 B1 | 7/2001 | Burke | |
| 6,390,280 B1 | 5/2002 | Boyce | |
| 6,471,767 B1 * | 10/2002 | Konczak | 106/739 |
| 6,820,733 B1 | 11/2004 | Werner, Jr. | |
| 6,916,146 B1 | 7/2005 | Lonardi et al. | |
| 6,976,819 B2 | 12/2005 | Kulbeth | |
| 7,000,757 B1 | 2/2006 | Schlegel et al. | |
| 7,270,061 B2 | 9/2007 | Ash | |
| 7,351,026 B2 | 4/2008 | Ash | |
| 7,381,023 B2 | 6/2008 | Ash | |
| 7,478,989 B2 | 1/2009 | Ash | |
| 2004/0057818 A1* | 3/2004 | Hedrick | 414/293 |
| 2004/0105739 A1 | 6/2004 | McCrory et al. | |
| 2005/0204947 A1* | 9/2005 | Ash | 104/26.1 |
| 2006/0198721 A1* | 9/2006 | Harrold | 414/378 |

FOREIGN PATENT DOCUMENTS

| | | |
|---|---|---|
| JP | 54-113165 | 9/1979 |
| JP | 57-114817 | 7/1982 |
| JP | 60-183433 | 9/1985 |
| JP | 05-069948 | 3/1993 |
| JP | 2003-246461 | 9/2003 |
| WO | WO 2005/069811 | 8/2005 |

OTHER PUBLICATIONS

Penta Modular Cement Rail Unloader, Penta Industrial Copr, builders for industry, 2 pages.

Picor, Data Sheet, Mass Flow Gates, 1 page, Jun. 6, 2006.

Picor, Data Sheet, Diverter Gates, 1 page, Jun. 6, 2006.

Ash, U.S. Appl. No. 12/163,781, filed Jun. 27, 2008.

Ash, U.S. Appl. No. 12/190,472, filed Aug. 12, 2008.

Dakota Fabricating—Dozer Trap, Dakota Fabricationg Inc., www.dakotafab.com/DozerTrap.html, accessed Feb. 2, 2007, pp. 1-6.

* cited by examiner

UNLOADING SYSTEM AND METHOD FOR CONTINUOUSLY MOVING RAPID DISCHARGE RAILCARS

PRIORITY CLAIM

Priority is claimed to U.S. Provisional Patent Application Ser. No. 61/072,182, filed Mar. 27, 2008, which is hereby incorporated herein by reference in its entirety.

BACKGROUND

1. Field of the Invention

The present invention relates generally to rapid discharge railroad cars, and more particularly to devices that unload rapid discharge railroad cars.

2. Related Art

Coal is often transported to processing or power plants by railroad cars. In the past, the plants have kept the railcars and unloaded the coal as needed. Unfortunately, such an unloading system utilized the railcars themselves for storage, so that the railcars are unavailable for use delivering coal. Therefore, coal processors have had to find other ways to unload coal trains and return the railcars to the railroad in shorter time periods, such as within eight hours for a 100 car train.

It has been suggested to unload the railcars by dumping the coal into a large pit, and then using conveyor belts to move the coal out of the pit. It will be appreciated, however, that the construction of a large pit required a large capital expense that is difficult to recover. In addition, construction of a large pit requires permits which can be difficult to obtain because they can interfere with underground water sources. Furthermore, deep pits can be difficult to maintain because they can interfere with the water table.

SUMMARY OF THE INVENTION

The inventor of the present invention has been recognized that it would be advantageous to develop a method and device for unloading aggregate material, such as coal, from a continuously moving railcar. Additionally, the inventor of the present invention has been recognized that it would be advantageous to develop a method and device that can receive an aggregate material from a moving railcar and move the aggregate material simultaneously with the moving railcar while removing or relocating the aggregate material away from the railcar. Furthermore, the inventor of the present invention has recognized that it would be advantageous to develop a method and device that can rapidly unload bulk material while requiring less capital expense.

The invention provides an unloading station for unloading bulk material from a moving railcar with a bottom discharge. The station includes a track having a pair of rails with the railcar movable on the track with the bulk material receivable around the pair of rails when the bottom discharge is opened. A synchronized parallel conveyor is oriented parallel with the pair of rails and forms a movable platform capable of receiving the bulk material in a pile extending into the railcar, and drawing the pile along in synchronization with the railcar as the railcar moves along the track to resist force from the pile against bottom discharge gates of the railcar. A break in or end of the parallel conveyor is disposed away from a proximal end of the parallel conveyor and is configured to allow the bulk material to pass therethrough. A hopper is disposed below the break in or end of the parallel conveyor configured to receive the bulk material. A lateral conveyor is disposed under the hopper and oriented transverse to the parallel conveyor configured to convey the bulk material away from the hopper.

In accordance with a more detailed aspect of the present invention, the station can include a frame positioned in a shallow excavation, less than 12 feet deep measured from a bottom of the pair of rails in line with existing rails from a railroad track.

In addition, the invention provides a method for unloading bulk material from a railcar with a bottom discharge including moving the railcar through an unloading station with a track having a pair of rails. The bottom discharge of the railcar is opened and the bulk material is released therefrom into a pile on a parallel conveyor while the railcar is moving. The parallel conveyor is moved with the pile of the bulk material thereon with the railcar. The bulk material on the parallel conveyor is allowed to fall into a hopper while the railcar is moving. The bulk material is laterally conveyed from the hopper and away from the unloading station with a lateral conveyor.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 6b is a partial cross-sectional view of the unloading station of FIGS. 1-4 taken along line 6b-6b of FIG. 6a;

FIG. 7b is a partial cross-sectional view of the unloading station of FIGS. 1-4 taken along line 7b-7b of FIG. 7a;

FIG. 8b is a detailed partial cross-sectional end view of the parallel conveyor of FIG. 8a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention provides for an unloading station for continuously unloading aggregate or bulk material from a bulk material transport vehicle, such as a railcar with a bottom discharge, as the transport vehicle continuously moves along a pair of tracks or a roadway. The unloading station can include a track with a pair of rails disposed on a frame that can be placed in a shallow excavation (less than twelve feet). The rails can be aligned with existing rails of a fixed railroad track. A synchronized parallel conveyor, such as a chain belt, can be oriented parallel with the rails to receive the bulk material from the bottom discharge of the railcar and into a pile on the conveyor that moves with the railcar. A break in or end of the parallel conveyor can allow the bulk material to pass therethrough into a hopper. A lateral conveyor can be disposed under hopper to transport material to a remote location away from the unloading station.

In use, a belly dump railcar, such as a rapid discharge railcar, can be pulled onto the station and the contents of the railcar can be dumped while over the frame or rails such that a lower portion of the contents of the railcar fall and pile onto the synchronized parallel conveyor below while an upper portion remains in the railcar. The parallel conveyor can then move the pile along with the railcar simultaneously, or in sync with the railcar as the railcar moves along the pair of rails. The lower portion of dumped material can then be removed by the lateral conveyor while the dumped material and railcar simultaneously move along the rails. In this way, the upper portion of the dumped material remaining in the railcar exerts only minimal forces against the railcar and the discharge doors while the railcar is moving and the lower portion of the material is being removed. Thus, the railcar can be unloaded while still moving along the tracks.

As illustrated in FIGS. 1-11, an unloading station, indicated generally at 10, is shown in accordance with an example of the present invention for use in unloading a continuously moving bulk material transport vehicle, such as a rapid discharge or bottom discharge railcar, indicated generally at 14, while the railcar moves along a railroad track. Such an unloading station can be utilized for rapidly unloading coal from belly dump or rapid discharge railcars to coal processing plants or power plants. The unloading station 10 can include a track with a pair of rails 18 which can be placed in-line with the railroad track to receive railcars.

The track and pair of rails 18 can be carried by and supported by a frame 22. The frame 22 can extend in a direction that is in-line with the railroad tracks. The frame can be sized and shaped to support and carry the track and pair of rails 18 over the shallow excavation. For example, the frame 22 can include a pair of I-beams 26 extending longitudinally along the frame and substantially parallel to the railroad tracks. Each I-beam 26 can be sized and shaped to support and carry one of the rails 18. The pair of rails 18 can be alignable with existing rails of the railroad track so as to provide a continuous pathway for railcars 14 traveling on the railroad track and onto the unloading station 10. The frame, or sections thereof, can have a length of approximately 50 feet. In one aspect, the frame can have an overall length of approximately 100 feet, formed by two sections of approximately 50 feet each. In addition, the frame can have a width of approximately 16.5 feet. Therefore, the frame, or sections thereof, can be manufactured remotely or off-site, and transported on highways in accordance with Department of Transportation regulations. The frame can also include sidewalls 30 on opposite lateral sides parallel with the track and pair of rails 18. The sidewalls can extend higher than the rails. The sidewalls and I-beams can be coupled together with cross-members.

The frame 22 with the track and the pair of rails 18 can be positioned in a shallow excavation 34. In accordance with one aspect of the present invention, the excavation can have a depth less than 12 feet (measured from the bottom of the track or pair of rails). In accordance with another aspect of the present invention, the excavation can have a depth less than 10 feet. It will be appreciated that the shallow excavation provides an advantage in that less capital expenses is involved in installing the unloading station, and water table issues can be avoided. In one aspect, a portion of the frame can be above a ground level and the remaining portion of the frame can be below ground. The excavation can include footings or retaining walls or the like upon which the frame is supported. All or a portion of the frame can be elevated above a bottom of the excavation to receive a hopper and a lateral conveyor as discussed in greater detail below.

Figure 9:
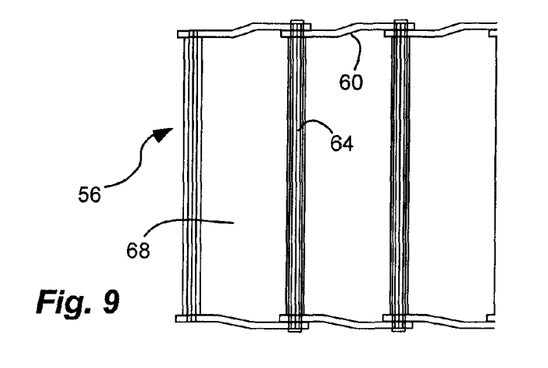
FIG. 9 is a partial top view of a continuous chain of the unloading station of FIGS. 1-4.
Figure 10A:
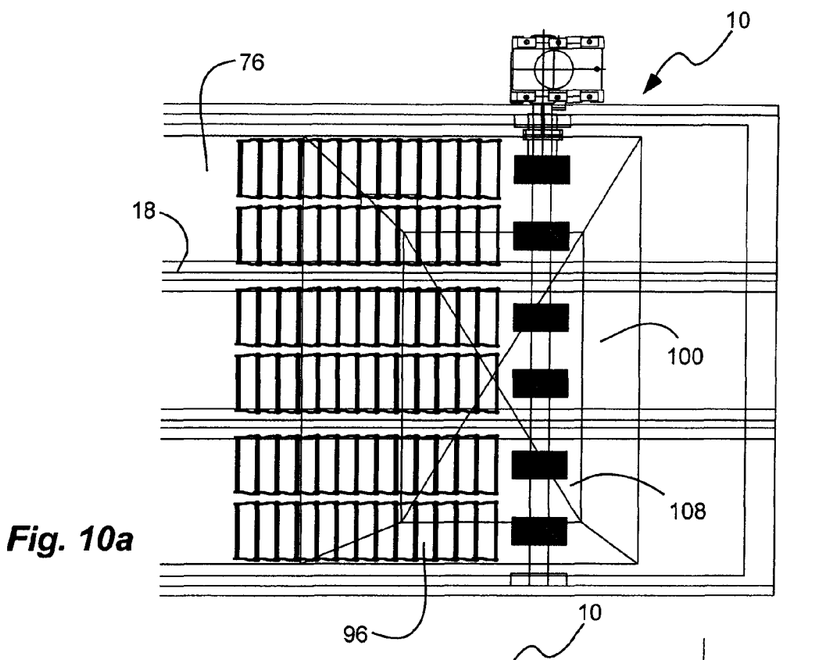
FIG. 10a is a partial top view of the unloading station of FIGS. 1-4 at the subsequent hopper.
Figure 10B:
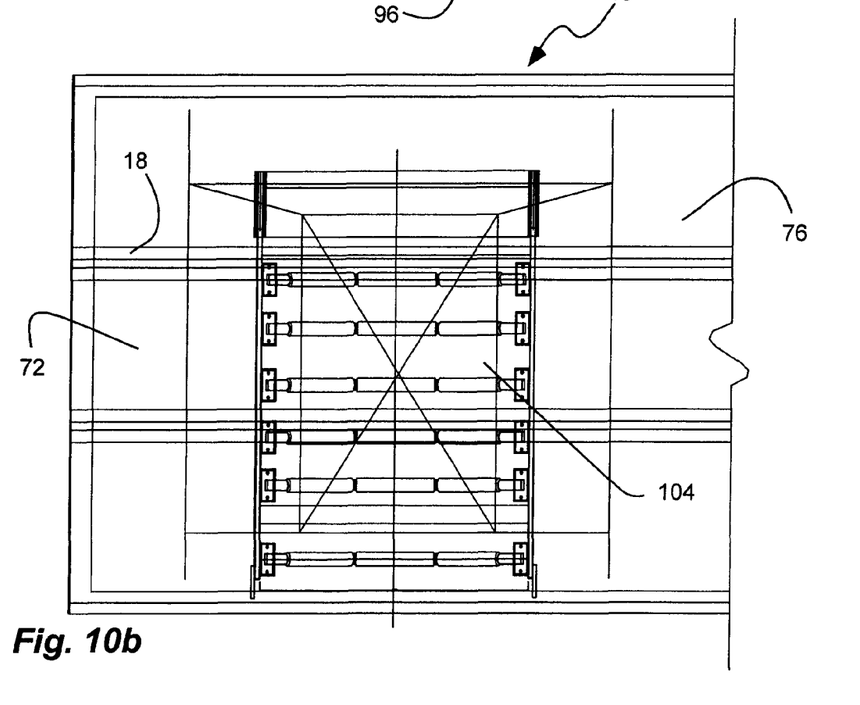
FIG. 10b is a partial top view of the unloading station of FIGS. 1-4 at the preliminary hopper with the continuous chain of the parallel conveyor removed.

A synchronized parallel conveyor, indicated generally at 40, can be carried by the frame 22 and oriented parallel with the track and the pair of rails 18. The parallel conveyor can include one or more conveyors disposed between and on opposite sides of the pair of rails. The parallel conveyor(s) can include two conveyors between the rails, and two conveyors on each side of the rails. Thus, the parallel conveyor(s) can have a width greater than five feet in one aspect, and can have a width of approximately 14 feet in another aspect. The parallel conveyor can extend substantially the entire length of the frame, approximately 90 feet, from a proximate end around a proximate sprocket(s) 44 which first encounters the railcar to a distal end around a drive sprocket(s) 48 where the railcar exits the station. The drive sprocket(s) can be coupled to a motor 52, such as an electric motor or hydraulic motor. The parallel conveyor 40 can include one or more continuous chains 56 looped around the sprockets 44 and 48. The chain(s) 56 can include opposite lateral links 60 coupled by pins 64, as shown in FIG. 9. The pin spacing can be approximately 8 inches and the pin length, or chain width, can be approximately 1 foot, 9 inches, creating an opening 68 of approximately 94 square inches. It will be appreciated that teeth on the drive sprocket can engage the openings and pins of the chain to move the chain.

Figure 5A:
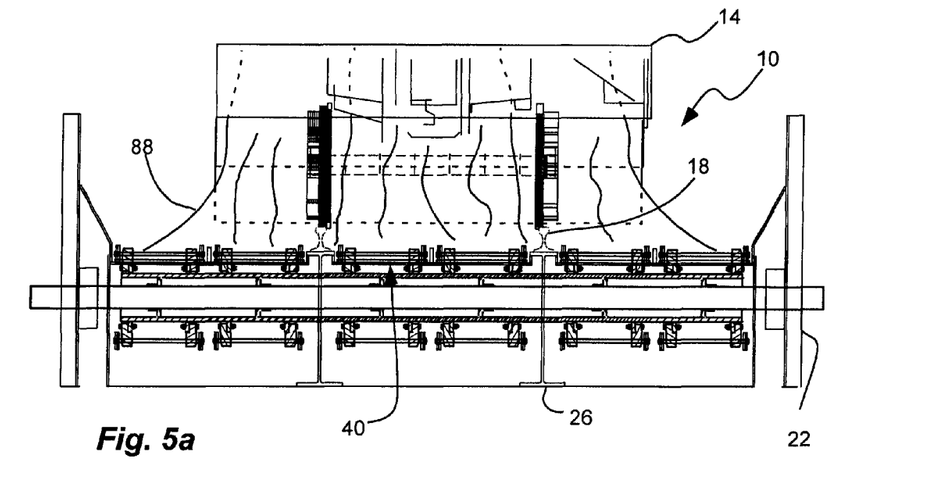
FIG. 5a is a partial schematic end view of the unloading station of FIGS. 1-4 shown with a railcar thereon and bulk material piled on a parallel conveyor.
Figure 5B:
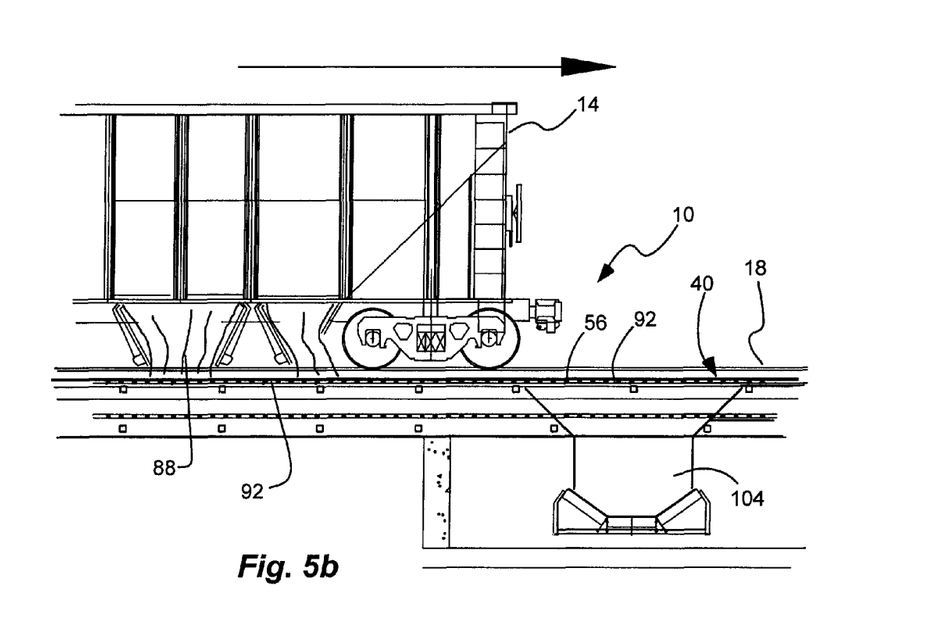
FIG. 5b is a partial schematic side view of the unloading station of FIGS. 1-4 shown with a railcar thereon and bulk material piled on a parallel conveyor.
Figure 6A:
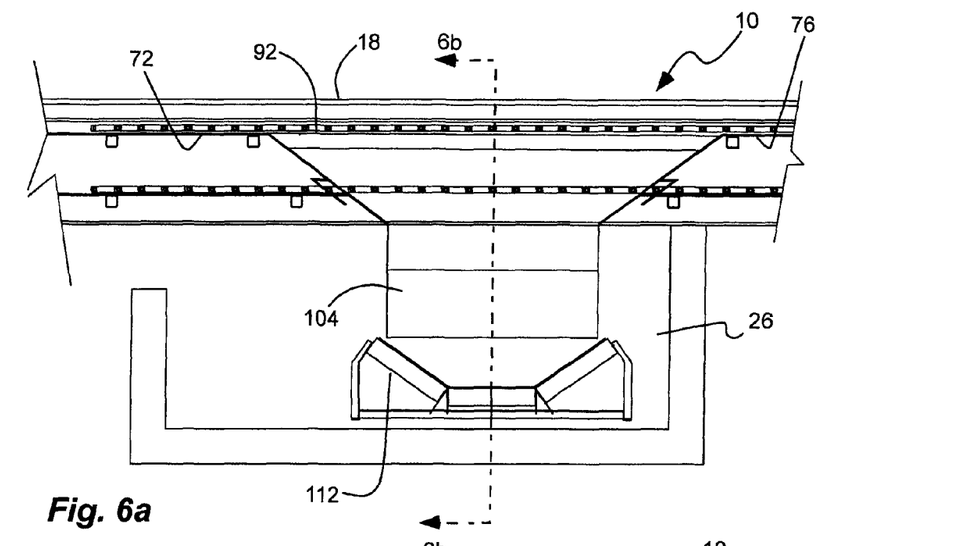
FIG. 6a is a partial side view of the unloading station of FIGS. 1-4 at a preliminary hopper.
Figure 6B:
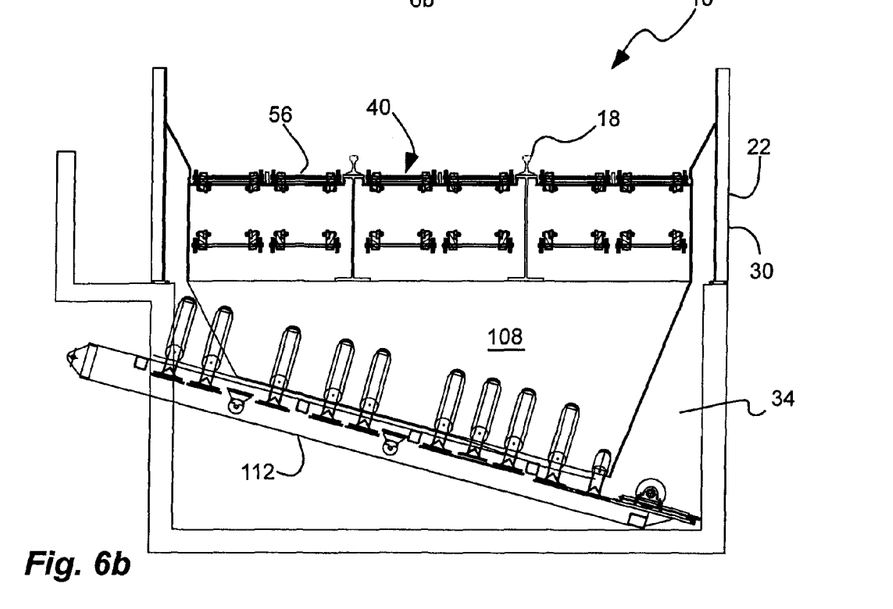
Figure 7A:
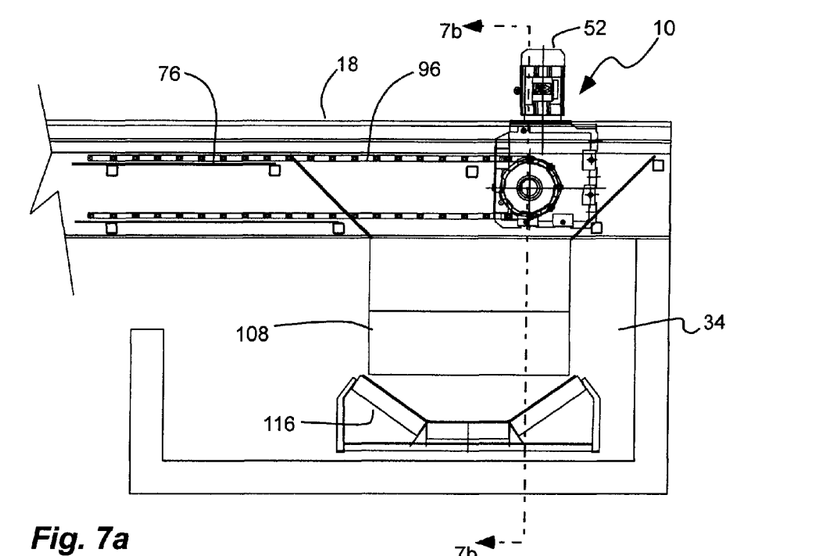
FIG. 7a is a partial side view of the unloading station of FIGS. 1-4 at a subsequent hopper.
Figure 7B:
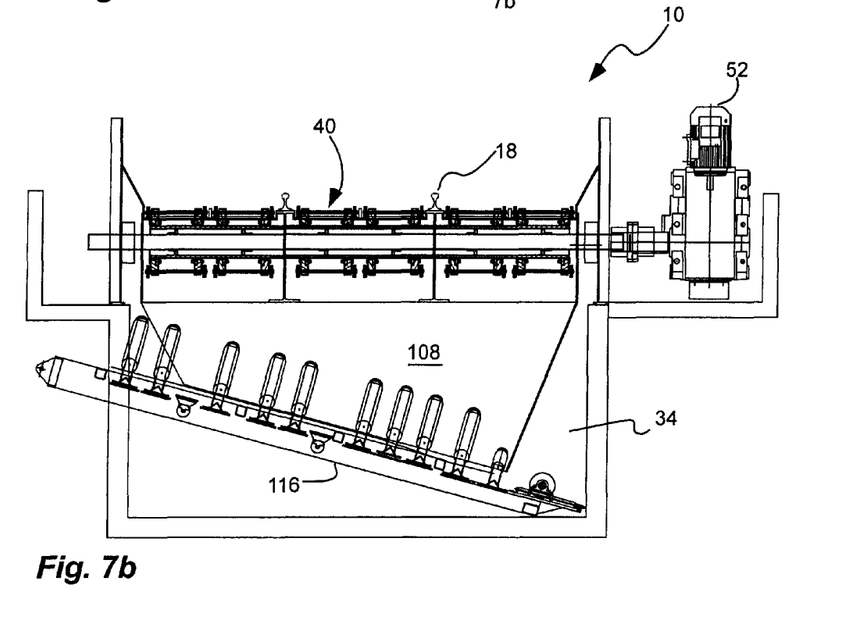
Figure 8A:
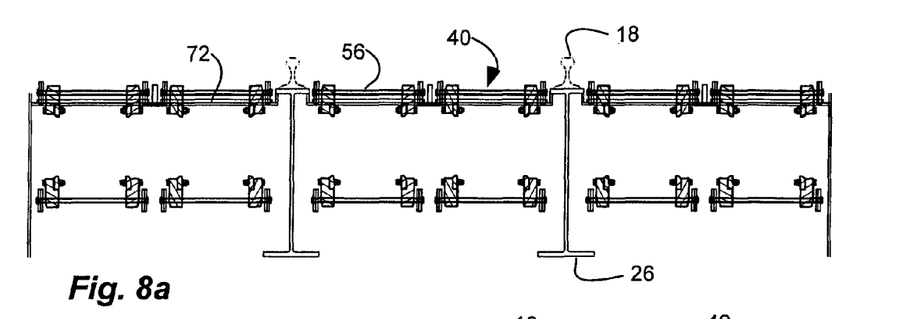
FIG. 8a is a partial cross-sectional end view of a parallel conveyor of the unloading stations of FIGS. 1-4 taken along line 8a-8a of FIG. 2.
Figure 8B:
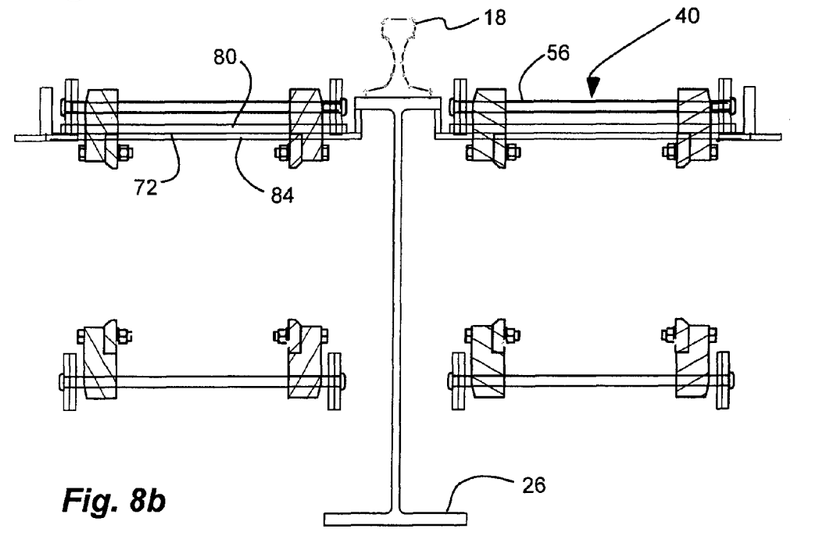

In addition, the parallel conveyor 40 can include one or more stationary decks, such as preliminary and subsequent stationary decks 72 and 76, respectively. The stationary decks can include a top layer 80 of low friction material supported by a lower layer 84 of structural material, such as metal or steel, as shown in FIG. 8b. The stationary decks can be supported on the frame by the I-beams, side walls, and/or cross-members. The chain 56 can be pulled across the stationary decks or low friction material thereof. The parallel conveyor or continuous chain movable across the decks can form a movable platform capable of receiving bulk material 88. The movable platform can have a preliminary portion defined by the preliminary stationary deck, and a subsequent portion defined by the subsequent stationary deck. In use, the station 10 receives a plurality of moving railcars 14 with bottom discharge along the track and the pair of rails 18. While in motion, the bottom discharge of the railcar 14 on the station 10 is opened and the bulk material 88 is received around the pair of rails and into a pile(s) on the parallel conveyor 40. It will be appreciated that only an initial portion of the bulk material is received onto the parallel conveyor, while a remaining portion of the bulk material remains in the railcar. Thus, the pile extends into the railcar. The parallel conveyor 40 draws the pile along synchronized with the movement of the railcar along the track, as shown in FIGS. 5*a* and 5*b*. The motor 52 can drive the conveyor so that it is synchronized with the railcar. It will be appreciated that gates of the bottom discharge hang down from the railcar about the pile of bulk material. Moving the pile of the bulk material along with the railcar resists the gates from plowing through the bulk material causing stress on the gates and/or derailment of the railcar.

One or more openings can be formed in the parallel conveyor, movable platform or stationary decks. For example, a preliminary break 92 can be disposed between the preliminary and stationary decks 72 and 76. As the chain 56 moves across the break 92, the bulk material 88 can fall or pass through the openings 68 (FIG. 9) in the chain and through the movable platform or stationary decks. It will be appreciated that the openings in the chain also grade the material. It will also be appreciated that the bulk material passes through the chain twice, once on the top, and again as the chain returns on the bottom. The preliminary break 92 can be disposed away from the proximal end of the parallel conveyor, such as more than 50 feet from the proximal end. Thus, an entire railcar can be received on the parallel conveyor prior to the preliminary break 92. In addition, a subsequent break 96 can be disposed near the distal end of the parallel conveyor. As another example, a subsequent end 100 of the parallel conveyor can be open. Thus, a preliminary portion of the bulk material can be received on the preliminary deck, and can pass through the preliminary break; while a subsequent or remaining portion of the bulk material can be received on the subsequent deck, and can pass through the subsequent break or fall off the subsequent end of the conveyor. A distance at the end of the parallel conveyor between the parallel conveyor and hopper can be greater than the openings in the chain to allow larger pieces of bulk material into the hopper.

In another aspect, the parallel conveyor can include one or more conveyor belts. The conveyor belts can extend parallel to the pair of rails and can move about a head pulley and a tail pulley in the direction of the travel of the railcar on the pair of rails. The conveyor belts can engage a lower portion of bulk material discharged from a railcar and move the bulk material parallel to the pair of rails to a discharge end of the conveyor system.

In yet another aspect, the parallel conveyor can include one or more chains or belts in series or tandem with the opening or break therebetween. Thus, the preliminary portion of the movable platform can be defined by one or more continuous chains movable over the preliminary stationary deck by one motor; and the subsequent portion of the movable platform can be defined by one or more separate continuous chains movable over the subsequent stationary deck by another motor.

One or more hoppers, such as preliminary and subsequent hoppers 104 and 108 respectively, can be disposed bellow the preliminary and subsequent breaks 92 and 96, and subsequent end 100. The hoppers can include walls to contain the bulk material. The walls can be inclined to funnel the bulk material. The hoppers can have an inlet opening with a width as wide as the parallel conveyor, and a length of approximately 11 feet. The hoppers can have an outlet opening that is smaller.

One or more lateral conveyors, such as preliminary and subsequent lateral conveyors 112 and 116, respectively, can be associated with the hoppers 104 and 108. For example, a beginning end of the lateral conveyors can be disposed under the hoppers. The lateral conveyors 112 and 116 can be oriented transverse, i.e. angled with respect to, the parallel conveyor. In addition, the beginning end of the lateral conveyors can be disposed in the excavation 34, and inclined with respect to the ground. It will be appreciated that the size of the lateral conveyors, width of the hoppers or outlet openings thereof, and inclination of the lateral conveyors contribute to the depth of the excavation below the frame and parallel conveyor. The lateral conveyors convey the bulk material out of and away from the hoppers. It will be appreciated that another conveyor system (not shown) can receive the bulk material from the lateral conveyors. The hoppers can extend from the decks or platform to the lateral conveyors to reduce coal dust from escaping.

The two lateral conveyors, and preliminary and subsequent breaks with their associated preliminary and subsequent decks, allow the railcar to be unloaded in two stages. Unloading the railcar in two stages allows the bulk material to be unloaded more continuously or constantly; which can be desirable if the coal is being processed.

Figure 11:
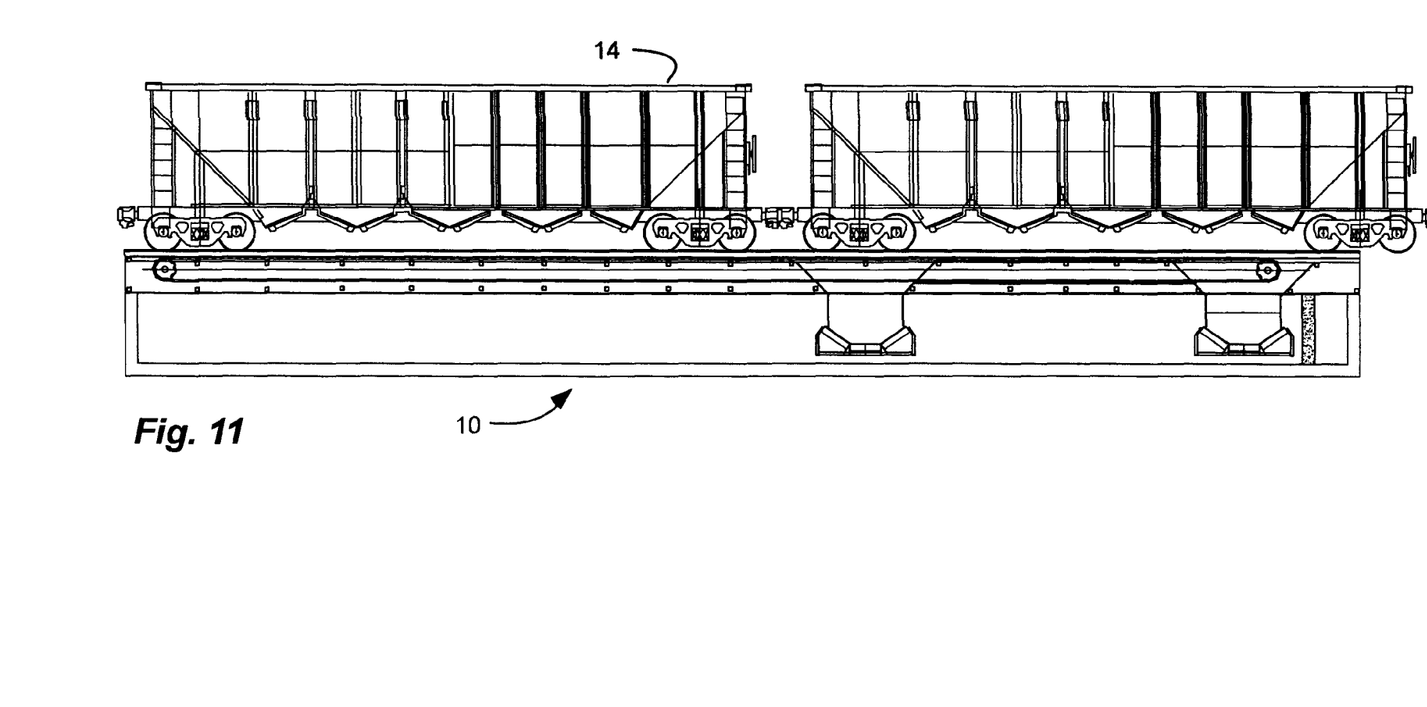
FIG. 11 is a partial side view of the unloading station of FIGS. 1-4 shown with railcars thereon and with the lateral conveyors removed.

In addition, having two removal points facilitates continuous movement of the railcars, as shown in FIG. 11. For example, when a first car passes the first discharge end and removal point and moves to the second chain belt, a second railcar can dump its material onto the first chain belt and together the two railcars can continue to move along the rails while the material transfer device simultaneously moves the dumped material along the rails in sync with the moving railcars. Thus, when the first railcar passes the second discharge end and is empty, the second car passes to the second chain belt and is partially empty, and a third car enters the unloading station and dumps its material onto the first chain belt. In this way, a very long train of railcars can be unloaded while the railcars are continuously moving.

Although two lateral conveyors have been shown and described, it will be appreciated that the station can be provided with a single lateral conveyor associated with a single break or end in the parallel conveyor and a single hopper. Alternatively, three or more lateral conveyors with associated breaks or ends and hoppers can be provided. In addition, although the lateral conveyors are shown extending from the same side of the station, it will be appreciated that they can extend from different sides of the station.

Furthermore, any number of unloading stations can be coupled together in series in order to unload the railcars of a multiple railcar train in a relatively quick and efficient manner. In this way, the unloading station of the present invention can be configured to unload a predetermined number of railcars in a predetermined amount of time. For example, the station can be configured to unload 100 railcars in an eight hour period, as currently required by some rail carriers.

As described above, the frame can be formed in two sections. The second section can include the openings, or break(s) and end. Thus, the excavation can be deeper (less than 12 feet or less than 10 feet) for the second section, and shallower for the first section. In addition, the excavation can be wider for at the second section to accommodate the lateral conveyors. In addition, the frame can be separate from the hoppers and lateral conveyors. Thus, the configuration of the lateral conveyors with respect to the frame can be more easily reconfigured. Furthermore, the shallow excavation and transportability of the frame allow the station to be more easily repositioned.

Figure 1:
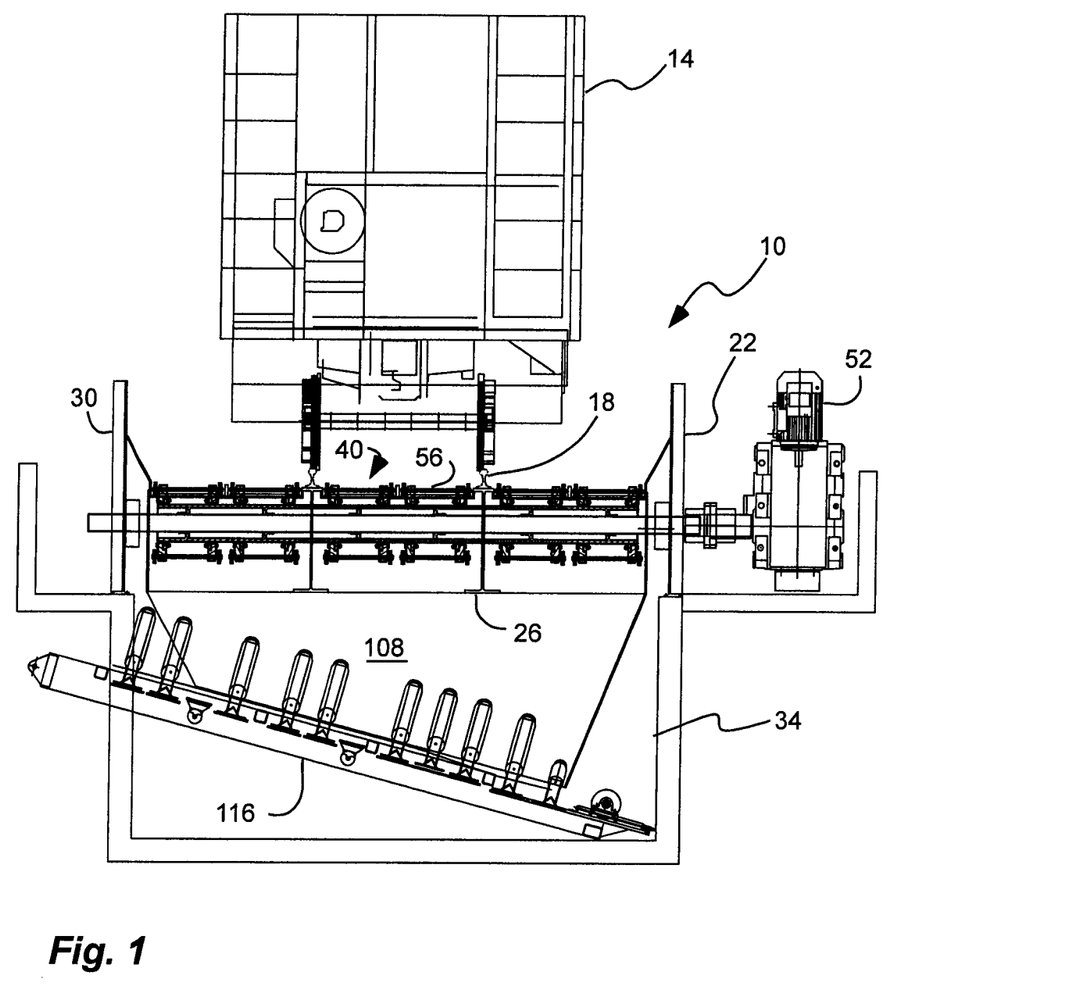
FIG. 1 is a partial cross-sectional end view of an unloading station in accordance with an embodiment of the present invention taken along line 1-1 of FIG. 2, shown with a railcar thereon and with lateral conveyors removed.
Figure 2A:
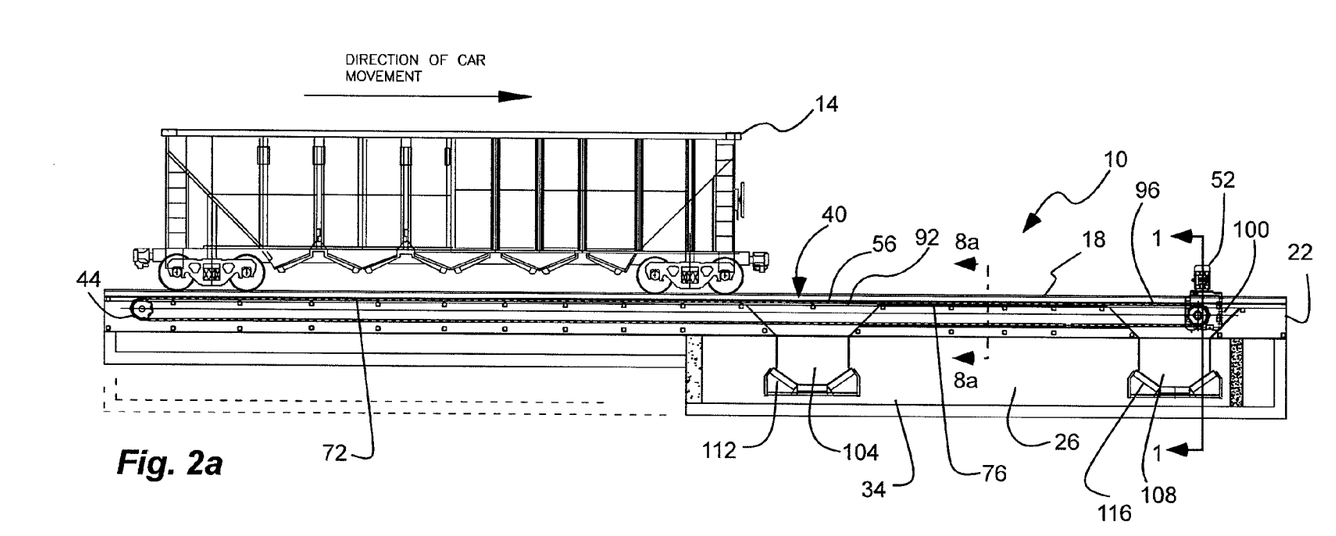
FIG. 2a is a partial side view of the bulk unloading station of FIG. 1, shown with a railcar thereon and with lateral conveyors removed.
Figure 2B:
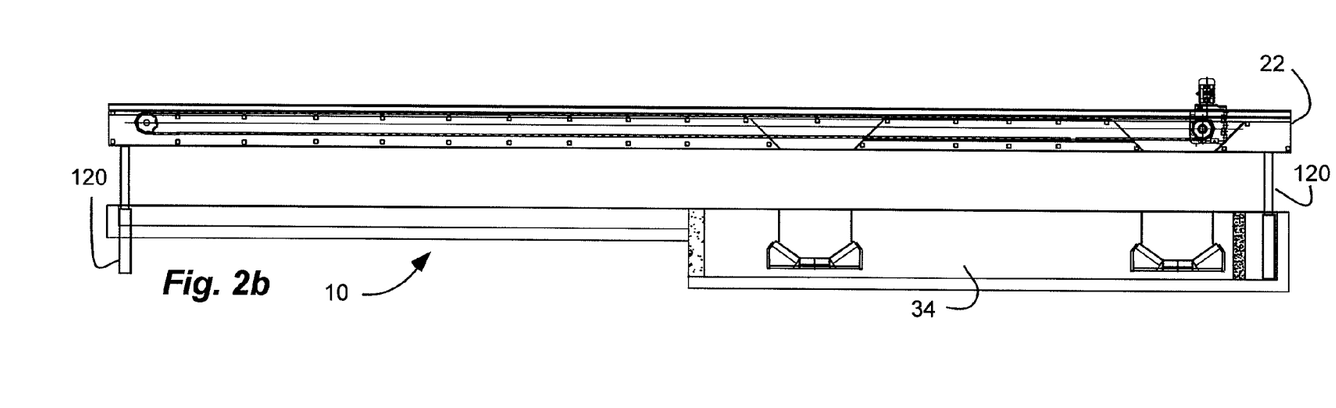
FIG. 2b is a partial side view of the bulk unloading station of FIG. 1, shown in a raised configuration for service and with lateral conveyors removed.
Figure 3:
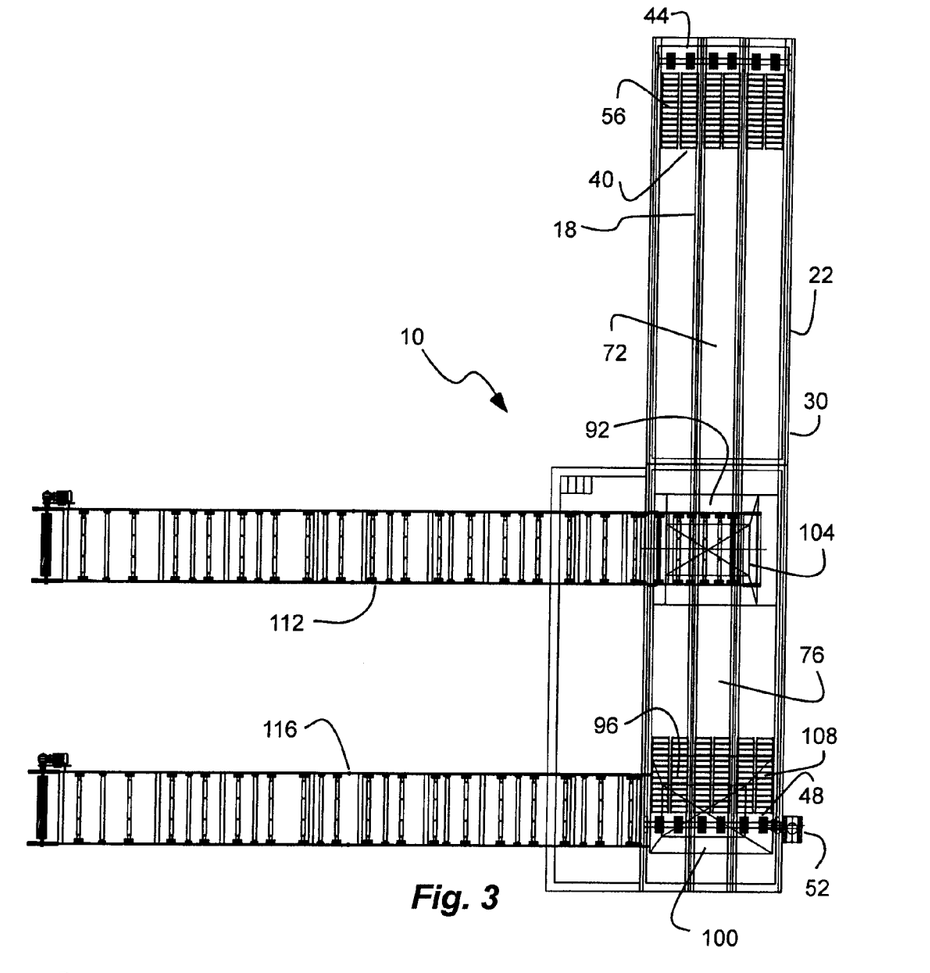
FIG. 3 is a top view of the unloading station of FIGS. 1 and 2a, shown with portions of a continuous chain removed.
Figure 4:
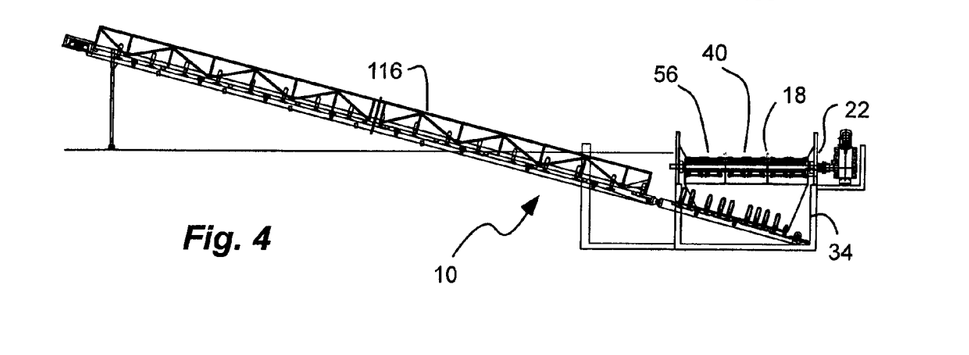
FIG. 4 is an end view of the unloading station of FIGS. 1, 2a and 3.

The station can further include a lift 120 disposed between the frame and the excavation, as shown in FIG. 2b. The lift can include one or more hydraulic cylinders. Thus, the frame can be lifted with respect to the hoppers and lateral conveyors for service.

The present invention also provides a method for using the unloading station described above or a method for unloading bulk material 88 from a railcar 14 with a bottom discharge. The railcar 14 is moved through an unloading station 14 with a track having a pair of rails 18. The bottom discharge of the railcar is opened, releasing the bulk material 88 from the railcar and into a pile on a parallel conveyor 40 while the railcar is moving. The parallel conveyor is moved with the pile of the bulk material thereon with the railcar. The movement of the parallel conveyor and the railcar can be synchronized so that they move together at substantially the same speed. Synchronization can be accomplished in numerous ways. For example, an operator of the unloading station can manually control the speed of the locomotive pulling the railcar with a wireless remote control so the speed of the locomotive and railcar match the speed of the parallel conveyor. As another example, an operator of the unloading station can manually control the speed of the motor 52 driving the parallel conveyor so that the speed of the parallel conveyor matches the speed of the railcar. As another example, sensors can be associated with the unloading station to sense or measure the speed of the railcar and automatically adjust the motor 52 via a controller.

The bulk material 88 in a pile on the parallel conveyor extends into the railcar, and is moved along with the railcar as the railcar moves by the parallel conveyor. The bulk material 88 can pass through the openings 68 (FIG. 9) in the continuous chain 56 and onto the stationary deck 72. The continuous chain 56 pulls the bulk material along the stationary deck 72. The bulk material 88 on the parallel conveyor and stationary deck is allowed fall into a hopper 104 while the railcar is moving. The continuous chain 56 pulls the bulk material over an opening or break 92 in the moving platform, such as an end of the preliminary stationary deck 72. The bulk material is laterally conveyed from the hopper 104 and away from the unloading station by a lateral conveyor 112.

The bulk material 88 can be unloaded entirely on the preliminary deck 72 and allowed to pass through the preliminary break 92 into the preliminary hopper 104. It will be appreciated that the preliminary break 92 can be the end of the continuous chain which can terminate in the vicinity of the preliminary hopper, i.e. somewhere above the hopper. Alternatively, the bulk material can be unloaded in stages, with an initial amount of the bulk material received onto the preliminary deck and through the preliminary break into the preliminary hopper. A remaining portion of the bulk material can be released from the railcar and onto a subsequent portion of the parallel conveyor beyond the preliminary hopper while the railcar is moving. The subsequent portion of the parallel conveyor can be a subsequent portion of the parallel conveyor, or a separate subsequent parallel conveyor separate from a preliminary parallel conveyor. For example, the remaining portion of the bulk material can be released onto a subsequent stationary deck 76 and moved along by the continuous chain 56. Thus, the subsequent portion of the parallel conveyor moves the remaining portion of the bulk material thereon with the railcar. The remaining portion of the bulk material on the subsequent portion of the parallel conveyor is allowed to fall into a subsequent hopper 108 while the railcar is moving. The remaining portion of the bulk material can pass through a subsequent opening or break 96 in the stationary deck 76 or moving platform, and/or subsequent end 100 of the parallel conveyor. The remaining portion of the bulk material is laterally conveyed from the subsequent hopper and away from the unloading station while the railcar is moving by a subsequent lateral conveyor 116. Again, it will be appreciated that any number of intermediate portions of the bulk material can pass through intermediate openings into intermediate hoppers.

The method can further include installing the unloading station 10 by causing an excavation 34 to be excavated less than 10-12 feet deep (measured from a bottom of the pair of rails in line with rails from a railroad track). The track with the pair of rails 18 can be formed on a frame 22 to carry the track. In addition, the stationary decks 72 and 76, I-beams 26, sidewalls 30 and/or cross-members can be formed on the frame. As described above, the frame can be formed in segments or portions, such as two portions as shown. The frame with the track is transported to the excavation. A proximal end of the lateral conveyor(s) 112 and 116 can be disposed in the excavation. The hopper(s) 104 and 108 can be disposed over the proximal end of the lateral conveyor(s) in the excavation. The frame with the track can be placed in the excavation, such as with a crane. The continuous chain 56 can by placed around the decks.

The method can further include raising the frame 22 with the track and the parallel conveyor with respect to the excavation 34 containing the frame and with respect to the lateral conveyor(s) with the lift 120.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An unloading station for unloading bulk material from a moving railcar with a bottom discharge, the station comprising:
   a) a track having a pair of rails alignable with a railroad track with the railcar movable on the track with the bulk material receivable around the pair of rails when the bottom discharge is opened;
   b) a synchronized parallel conveyor disposable below the railcar and oriented parallel with the pair of rails and forming a movable platform capable of receiving the bulk material in a pile extending into the railcar and drawing the pile along in synchronization of direction and speed with the railcar as the railcar moves along the track to resist force from the pile against bottom discharge gates of the railcar;

c) a break in or end of the parallel conveyor disposed away from a proximal end of the parallel conveyor and configured to allow the bulk material to pass therethrough;
d) a hopper disposed below the break in or end of the parallel conveyor configured to receive the bulk material; and
e) a lateral conveyor disposed under the hopper and oriented transverse to the parallel conveyor configured to convey the bulk material away from the hopper.

2. A station in accordance with claim 1, further comprising:
a frame positionable in an excavation less than 12 feet deep measured from a bottom of the pair of rails in line with existing rails from a railroad track, the frame carrying the pair of rails over the excavation and carrying the parallel conveyor.

3. A station in accordance with claim 2, further comprising:
a lift coupled to the frame to raise the frame with the pair of rails and the parallel conveyor with respect to the excavation and the lateral conveyor.

4. A station in accordance with claim 1, wherein the movable platform is a preliminary portion, the break or the end is a preliminary break, and the hopper is a preliminary hopper, and further comprising:
a) a subsequent portion of the movable platform disposed subsequent to the preliminary portion of the movable platform and the preliminary break in a direction of travel of the conveyor;
b) a subsequent break in or end of the parallel conveyor disposed subsequent to the preliminary break;
c) a subsequent hopper disposed below the subsequent break in or end of the parallel conveyor; and
d) a subsequent lateral conveyor disposed under the subsequent hopper and oriented transverse to the parallel conveyor configured to convey the bulk material away from the subsequent hopper.

5. A station in accordance with claim 4, wherein the preliminary and subsequent movable platforms further comprise:
preliminary and subsequent stationary decks with the preliminary break therebetween; and
wherein the parallel conveyor further comprises:
a continuous chain movable over both preliminary and subsequent stationary decks, and over the preliminary break, with chain openings through the chain to the stationary decks.

6. A station in accordance with claim 1, wherein the parallel conveyor further comprises:
a stationary deck; and
a continuous chain movable over the stationary deck with chain openings through the chain to the stationary deck.

7. A station in accordance with claim 1, wherein the parallel conveyor is wider than the pair of rails and has a width greater than five feet.

8. A station in accordance with claim 1, wherein the parallel conveyor extends beyond the lateral sides of the track.

9. A station in accordance with claim 1, wherein the lateral conveyor is extendable from either side of the parallel conveyor.

10. A station in accordance with claim 1, further comprising:
multiple hoppers each disposed at a different position along the parallel conveyor; and
multiple lateral conveyors each disposed under a different one of the multiple hoppers; and
the multiple lateral conveyors being independently controllable with respect to one another.

11. An unloading station for unloading bulk material from a moving railcar with a bottom discharge, the station comprising:
a) an excavation less than 12 feet deep below a railroad track;
b) a frame disposed in the excavation having a pair of rails inline with the railroad track, the railcar movable on the pair of rails with the bulk material receivable around the pair of rails when the bottom discharge is opened;
c) a synchronized parallel conveyor carried by the frame below a top of the pair of rails and oriented parallel with the pair of rails and capable of receiving the bulk material in a pile extending into the railcar and drawing the pile along with the railcar in the same direction and at the same speed as the railcar moves along the track, the parallel conveyor including:
  i) a preliminary stationary deck;
  ii) a subsequent stationary deck in a direction of travel of the conveyor;
  iii) a preliminary break between the preliminary and subsequent stationary decks configured to allow the bulk material to pass therethrough;
  iv) a subsequent break in or end of the subsequent stationary deck; and
  v) a continuous chain movable over both preliminary and subsequent stationary decks, and over the preliminary break, with chain openings through the chain to the stationary decks;
d) a preliminary hopper disposed below the preliminary break configured to receive the bulk material;
e) a preliminary lateral conveyor disposed under the preliminary hopper and oriented transverse to the parallel conveyor configured to convey the bulk material away from the preliminary hopper;
f) a subsequent hopper disposed below the subsequent break in or end of the subsequent stationary deck configured to receive the bulk material; and
g) a subsequent lateral conveyor disposed under the subsequent hopper and oriented transverse to the parallel conveyor configured to convey the bulk material away from the subsequent hopper.

12. A station in accordance with claim 11, further comprising:
a lift coupled to the frame to raise the frame with the pair of rails and the parallel conveyor with respect to the excavation and the lateral conveyors.

13. A station in accordance with claim 11, wherein the parallel conveyor extends beyond the lateral sides of the pair of rails.

14. A station in accordance with claim 11, wherein the lateral conveyors are extendable from either side of the parallel conveyor.

15. A method for unloading bulk material from a railcar with a bottom discharge, comprising:
a) moving the railcar through an unloading station with a track having a pair of rails aligned with the railroad track;
b) opening the bottom discharge of the railcar and releasing the bulk material therefrom around the pair of rails and into a pile on a parallel conveyor below the railcar and below a top of the pair of rails while the railcar is moving;
c) moving the parallel conveyor with the pile of the bulk material thereon With along with the railcar at the same speed and in the same direction as the railcar;
d) allowing the bulk material on the parallel conveyor to fall into a hopper while the railcar is moving; and e) laterally conveying the bulk material from the hopper and away from the unloading station with a lateral conveyor.

16. A method in accordance with claim 15, further comprising:
   synchronizing movement of the parallel conveyor with the railcar.

17. A method in accordance with claim 15, further comprising:
   a) releasing a remaining portion of the bulk material from the railcar and onto a subsequent portion of the parallel conveyor beyond the hopper in a direction of travel of the conveyor while the railcar is moving;
   b) moving the subsequent portion of the parallel conveyor with the remaining portion of the bulk material thereon with the railcar;
   c) allowing the remaining portion of the bulk material on the subsequent portion of the parallel conveyor to fall into a subsequent hopper while the railcar is moving; and
   d) laterally conveying the remaining portion of the bulk material from the subsequent hopper and away from the unloading station while the railcar is moving with a subsequent lateral conveyor.

18. A method in accordance with claim 15, further comprising:
   a) causing an excavation to be excavated less than 12 feet deep measured from a bottom of the pair of rails in line with rails from a railroad track;
   b) forming the track on a frame;
   c) transporting the frame with the track to the excavation;
   d) disposing a proximal end of the lateral conveyor in the excavation;
   e) disposing the hopper over the proximal end of the lateral conveyor in the excavation; and
   f) placing the frame with the track in the excavation.

19. A method in accordance with claim 15, further comprising: raising a frame with the track and the parallel conveyor with respect to an excavation containing the frame and with respect to the lateral conveyor with a lift.

\* \* \* \* \*